US006186283B1

(12) United States Patent
Luker

(10) Patent No.: US 6,186,283 B1
(45) Date of Patent: Feb. 13, 2001

(54) VEHICLE-ANCHOR-STABILIZATION SYSTEM FOR WINCHING OPERATIONS

(75) Inventor: Ernest P. Luker, Salinas, CA (US)

(73) Assignee: Central Coast Patent Agency, Aromas, CA (US)

( * ) Notice: Under 35 U.S.C. 154(b), the term of this patent shall be extended for 0 days.

(21) Appl. No.: 09/201,645

(22) Filed: Nov. 30, 1998

(51) Int. Cl.[7] ........................................................ B60T 3/00
(52) U.S. Cl. ................................................ 188/32; 188/7
(58) Field of Search ..................... 52/155–160, 162–166, 52/146; 188/32, 4 R, 5, 7, 6, 23; D12/217; 410/30, 42, 49

(56) References Cited

U.S. PATENT DOCUMENTS

| 1,912,038 | * | 5/1933 | Irish | 188/32 |
| 2,822,890 | * | 2/1958 | Kriewaldt | 188/32 |
| 3,219,152 | * | 11/1965 | Castellani et al. | 188/32 |
| 3,695,394 | * | 10/1972 | Carpenter | 188/32 |
| 4,058,292 | * | 11/1977 | Goodrich et al. | 254/88 |
| 4,487,396 | * | 12/1984 | Hoffman | 254/327 |
| 4,569,422 | * | 2/1986 | Hoffman | 188/7 |
| 5,437,128 | * | 8/1995 | Gremillion | 52/162 |
| 5,444,949 | * | 8/1995 | Ciaccio | 52/155 |
| 5,850,715 | * | 12/1998 | Francis | 52/155 |

FOREIGN PATENT DOCUMENTS

5033411 * 12/1993 (JP) ........................................ 188/32

* cited by examiner

*Primary Examiner*—Robert J. Oberleitner
*Assistant Examiner*—Melanie Talavera
(74) *Attorney, Agent, or Firm*—Donald R. Boys; Central Coast Patent Agency

(57) ABSTRACT

An anchor system for stabilizing a vehicle during a pulling operation, such as with a winch or a come-along, has a wheel or track stop with a tether that attaches to a frame member, such as a bumper, of the pulling vehicle. The wheel or track of the vehicle rides over the stop, past center, and is prevented from further rolling by the tether. The forces on the vehicle are concentrated on a front edge of the stop, effectively anchoring the vehicle, which tends to rotate about the front edge as a fulcrum.

10 Claims, 4 Drawing Sheets

VEHICLE-ANCHOR-STABILIZATION SYSTEM FOR WINCHING OPERATIONS

FIELD OF THE INVENTION

The present invention is in the field of tools related to vehicles, and pertains more particularly to apparatus for stabilizing a vehicle during winching operations.

BACKGROUND OF THE INVENTION

Many utility and all-terrain vehicles, and emergency vehicles as well, are equipped with a winch. A winch is most often attached to a vehicle by a secure bolting or welding arrangement to a frame, bumper, or other member that is designed to provide a secure and stable mount.

A winch typically comprises an arrangement of meshed gears driven by a power input and operationally attached to a rotary cable-spool. A length of steel cable or the like is provided with one end fixedly attached to the spool. Various apparatus may be affixed to the free end of the cable, which may be removeably attached to an object to be pulled, or to a stable object such as a tree to facilitate a reverse pull.

A winch may be electrically powered, manually operated, or powered by some other power source. In some apparatus, often termed a come-along, a cable may be attached to the vehicle and to another vehicle or object, and a ratcheting apparatus is provided between the two which has the effect of shortening the cable to provide a pulling effect. The overall effect is the same as using a winch.

As is known in the art, there are multiple uses for a winch that range from freeing stuck vehicles, to operations such as stump puling, post pulling, and the like. As a general rule, winches are designed to have different pull loads or strengths for differing situations. For example, a heavier vehicle may require a more powerful winch whereas a lighter vehicle a less powerful winch and so on. The winch has many documented uses and is well known in the art.

A serious problem that may occur during a winching operation is that the vehicle with the winch may not be anchored effectively. In this instance a stuck vehicle that is much heavier than a rescue vehicle will likely remain stuck, as the rescue vehicle supporting the winch will simply move toward the stuck vehicle during operation. This instability is due to the simple fact that the resistance of the stuck vehicle is simply greater than the pulling power of the pulling vehicle.

In conventional situations makeshift boards or wheel blocks may be used to constrain a vehicle from rolling or sliding forward during winching. Sometimes weight may be added to a vehicle by way of placing rocks or other heavy payloads into a truck bed. These techniques aid only marginally. Furthermore, such makeshift techniques are generally burdensome and time consuming.

What is clearly needed is a method and apparatus for anchoring and stabilizing a winch-operating vehicle such that the vehicle will remain fixed under application of pulling force much greater than would typically cause such a vehicle to roll or slide.

SUMMARY OF THE INVENTION

In a preferred embodiment of the present invention a vehicle anchor is provided, comprising a stop for blocking a track or wheel of a vehicle, the stop having a first edge, a second edge, and an elevated center portion separating the edges; a tether having a first end fixedly attached to the stop and a second end with an interface for connecting to a vehicle member. In one embodiment the stop is a portion of a tubing cut longitudinally, and the tubing may be a section of standard pipe. Angle iron and other geometric shapes may also be used.

In a preferred embodiment the tether is a length of chain, but could also be a length of fiber strap. In some embodiments the stop has a protruding lip portion to one side of the elevated center portion, the lip portion for engaging the track or wheel of the vehicle. In some embodiments as well, the tether attaches to the stop to one side of the elevated center portion. In some cases the vehicle member to which the tether attaches is a storage and deployment apparatus for storing and deploying the vehicle anchor, which may be integrated with a winch attached to the vehicle.

In another aspect of the invention a system for anchoring a vehicle during a pulling operation is provided, comprising a vehicle anchor having a stop for blocking a track or wheel of a vehicle, the stop having a first edge, a second edge, and an elevated center portion separating the edges, and a tether having a first end fixedly attached to the stop and a second end; and a storage and deployment apparatus connected to the second end of the tether, such that the stop may be stored in a retracted position and deployed by feeding out the tether to place the stop proximate the track or wheel. In some embodiments of the system the storage and deployment apparatus is a winch.

In yet another aspect of the invention a method for anchoring a vehicle during a pulling operation is provided comprising steps of (a) placing a stop having a first edge, a second edge, and an elevated center portion separating the edges in front of a track or wheel of the vehicle; and (b) securing a tether having a first end fixedly attached to the stop by a second end to a vehicle member in a manner that the tether allows the vehicle track or wheel to roll up on the elevated center portion, but not to pass over the stop. In this method, in step (b), the vehicle member is a storage and deployment apparatus for storing the stop and deploying the stop for placement in step (a).

In the apparatus and methods of the invention taught in enabling detail below, for the first time, a vehicle blocking apparatus is provided that effectively anchors a vehicle during a pulling operation to several times the force which other, conventional methods and apparatus provide.

BRIEF DESCRIPTION OF THE DRAWING FIGURES

DESCRIPTION OF THE PREFERRED EMBODIMENTS

According to an embodiment of the present invention, a method and apparatus is provided for suitably anchoring and stabilizing a vehicle during operation of a traditional winch, such that the vehicle does not slide forward during such operation. The method and apparatus of the present invention is disclosed in enabling detail below.

Figure 1:
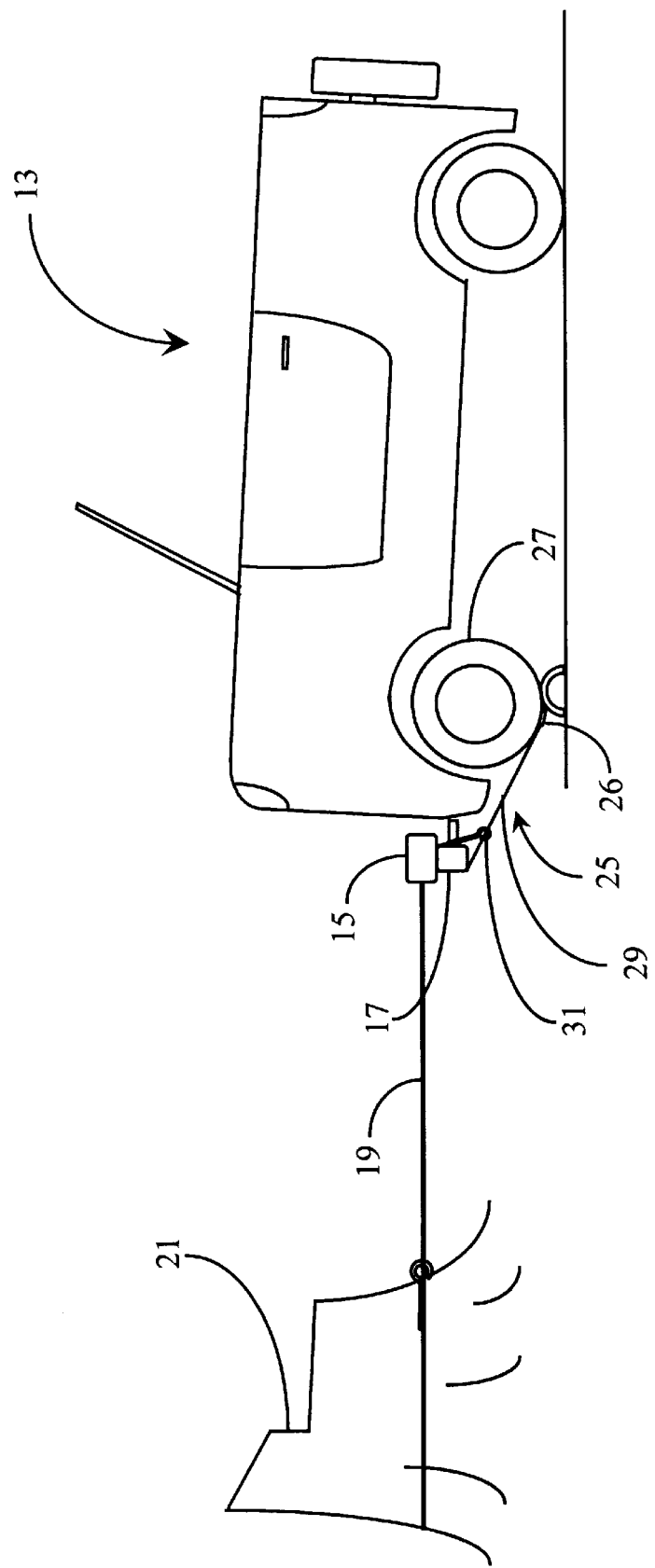
FIG. 1 is an elevation view of a vehicle-stabilizing anchor attached to a vehicle during a winching operation according to an embodiment of the present invention.

FIG. 1 is an elevation view of a vehicle-stabilizing anchor 25 as used with a vehicle 13 during a winching operation according to an embodiment of the present invention. Vehicle 13 in this embodiment has an electric winch 15 suitably mounted to a frame structure 17, which in this embodiment is a bumper. Vehicle 13 may be any type of vehicle capable of supporting and operating winch 15. Frame structure 17 may be a structure especially designed and frame-welded for the purpose of providing a secure mounting location for winch 15. In another embodiment, frame structure 17 may be a reinforced bumper, or other suitable bolt-on mounting structure such as may be provided with winch 15.

In this example the winching operation involves vehicle 13 attempting to remove a stump 21 by anchoring the vehicle and pulling on the stump with a cable 19 by the winch. Winch 15 is typical of known winches regarding internal structure (not shown) such as gears, electric motor, cable-spooling apparatus, and so on.

The likely success of the operation of pulling the stump depends on the ability of the vehicle to provide sufficient traction to the earth to avoid being drawn toward the stump. Blocks or stops may be placed under the tires, such as tire 27, in order to inhibit forward movement or sliding of the vehicle. Additional weight may also be added to vehicle 13 to further anchor the vehicle. Still, at some point, the vehicle will still slide forward toward the stump if the stump provides sufficient resistance and the winch and cable can withstand the forces involved.

In this embodiment a pair of vehicle-stabilizing anchors 25 are provided each comprising a portion of a heavy-gauge steel tube cut in two pieces substantially along the longitudinal centerline. The two half-round sections produced provide a right anchor for the passenger-side tire and a left anchor (25) for the driver-side tire. The length of tubing used to provide the anchors is of suitable length to encompass the width of a typical all terrain tires. One to two feet in length is sufficient for the purpose of the present invention. Any suitable diameter of tubing may be used as long as a half-round is of sufficient height to form an obstacle to vehicle 13 when placed (cut edges down) on the ground in front of tire 27.

In a preferred embodiment, each anchor has an appended lip 26, described in further detail below, provided for engaging the tires, such as tire 27, after the tires roll over the top of each respective anchor. Each anchor has a suitable tether 29 attached thereto for connecting to frame structure 17. Tether 29 may be a heavy-gauge chain such as is used in towing, a steel cable such as cable 19 of winch 15, or such as a nylon strap, among other suitable materials. Tether 29 may be attached to anchor 25 or lip 26 by any one of several known methods such as bolting, welding, and so on. The free end of tether 29 in this embodiment has a hook 31 for attaching to frame structure 17. Passenger-side and driver-side implementations are identical.

In this example, tether 29 is illustrated as a chain wrapped around bumper 17 and latched on to itself by hook 31. This simple implementation is meant to be exemplary only. One with skill in the art will recognize that there are numerous ways to affect attachment. For example, hook 31 may simply hook to a frame-hook provided for the purpose. In one embodiment, winch 15 may have two extra spools for spooling tether 29 such that by a pulling and locking technique, or ratchet, one may obtain a suitable and precise length to effect attachment of anchors 25 to a frame structure of the vehicle.

According to a preferred embodiment of the present invention, tether 29 is of a suitable length that tire 27 may roll on to, but not completely over anchor 25. The length of the tether and the structure and placement of lip 26 cooperate to provide this important function. Because tether 29 is attached to anchor 25 and frame-structure 17, an effective stop is created. Because the vehicle is prevented from rolling over the anchors, the force forward from cable 19 will tend to raise the back of the vehicle around the front edge of the anchors as a pivot, applying all forces downward on the front edge of the anchors. This action causes the anchors to be urged into the surface (ground, pavement).

Because of the tilting action for the vehicle imposed by the apparatus of the invention, as more weight is shifted to anchor 25, more stability is afforded for pulling stump 21. At a theoretical point when the back tires of vehicle 13 will have left the ground, the entire weight of vehicle 13 has been shifted to anchor 25. Anchor 25 acts to dig into any surface it is placed upon when more pull-force is added, which causes more weight to shift to the front of vehicle 13. More detail regarding the innovative method of vehicle stabilization is provided below.

Figure 2:
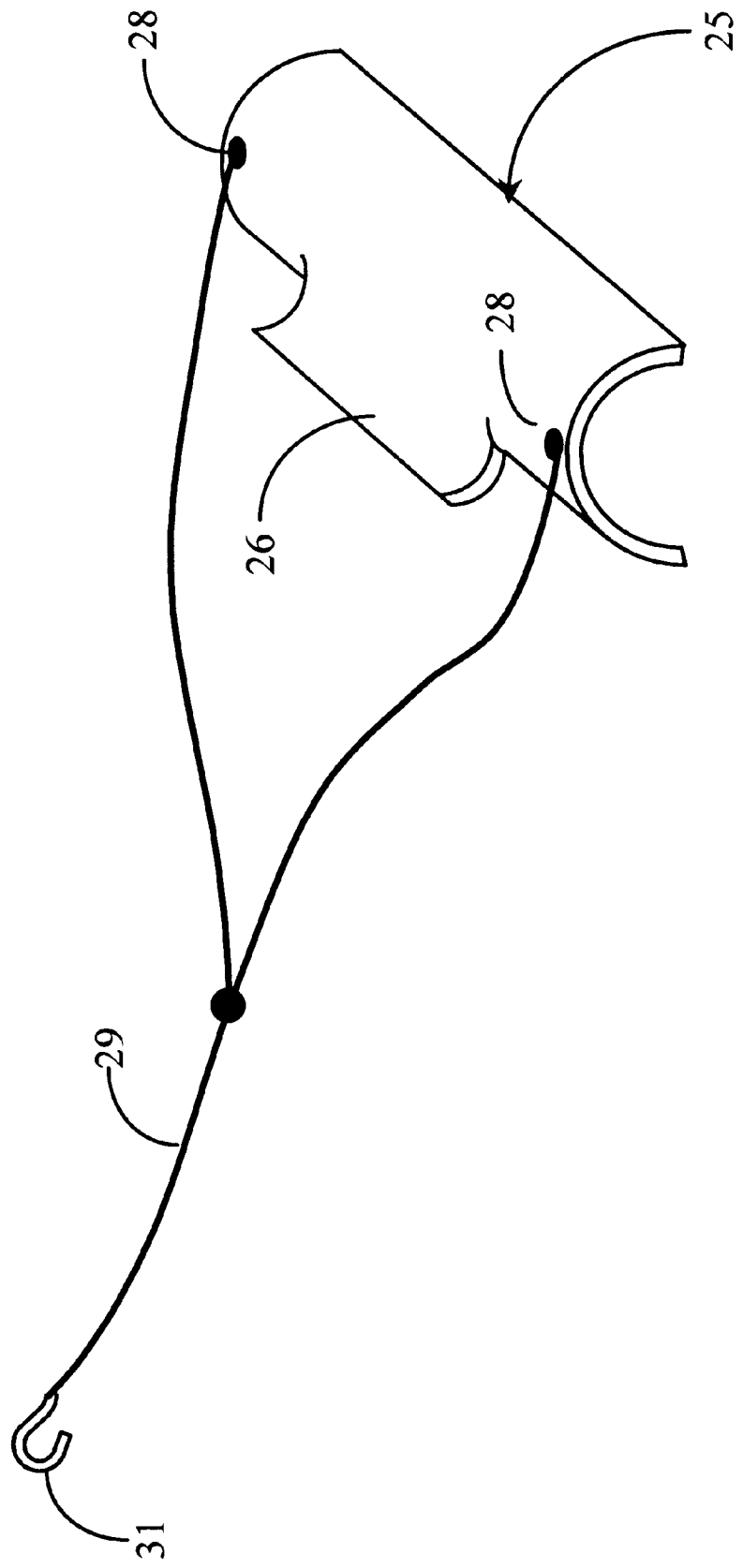
FIG. 2 is a perspective view of the vehicle anchor of FIG. 1.

FIG. 2 is a perspective view of one anchor 25 of FIG. 1. Lip 26 is formed by cutting into the pipe section of anchor 25 substantially at a right angle to the longitudinal axis in two places, and bending the piece of material between the cuts upward. Lip 26 can also be accomplished by welding material on to anchor 25. The resulting lip forms a stop upon which the wheel of the vehicle rests after it passes over the center of the anchor. Tether 29 in this embodiment attaches to a hook 31 at the free end, which may be used to fasten to the vehicle frame, such as to the bumper. The tether is implemented with two extensions as shown, with each of the two extensions fastening at points 28 to opposite ends of the anchor. In this embodiment is not necessary that the vehicle wheel contact the tether. The tether is attached to the vehicle with the appropriate length that the tether will not allow the vehicle tire to roll off lip 26.

Lip 26 is convenient, and not a requirement in the invention. In some embodiments there is no formed lip, and tether 29 attaches to the anchor to one side of center, the tire will contact the tether after passing over center, tightening the tether and thereby preventing further rolling of the tire.

In another embodiment, anchors 25 may be integrated with a winch or a body portion of the vehicle such that a spool for each tether 29 may be provided as part of the vehicle assembly. A ratcheting, or pull-and-lock technique is incorporated in this embodiment and used to allow a user to pull physically or let out via electric motor, a length of tether with anchor attached that is consistent to the vehicle frame to outside wheel dimension. After use, tethers may be fully retracted with anchors perhaps fitting in recesses in the underside of the frame. This integrated embodiment would be useful for vehicles used frequently for pulling operations of the sort that require such anchoring.

Anchor 25 may be of another shape than half-round tubes without departing from the spirit and scope of the present invention. For example, a hex-shaped tubing may be used instead. In some embodiments angle iron is used. The purpose of using a round tube that is split in half is for convenience in manufacture and provision of a maximally strong construction that is resistant to collapse.

Also in some embodiments the forward edge of the anchor may be toothed or serrated to facilitate bite into a supporting surface. For example, for vehicles employed in areas where most pulling operations might be employed with the vehicle on a concrete or other paved surface, the leading edge of the anchor may be suitably shaped to improve engagement to the pavement. In some embodiments attachments may be provided for assembly to the leading edge of each anchor to perhaps facilitate anchoring in hard pavement or soft surfaces. There are many such variations within the scope of the invention.

Figure 3:
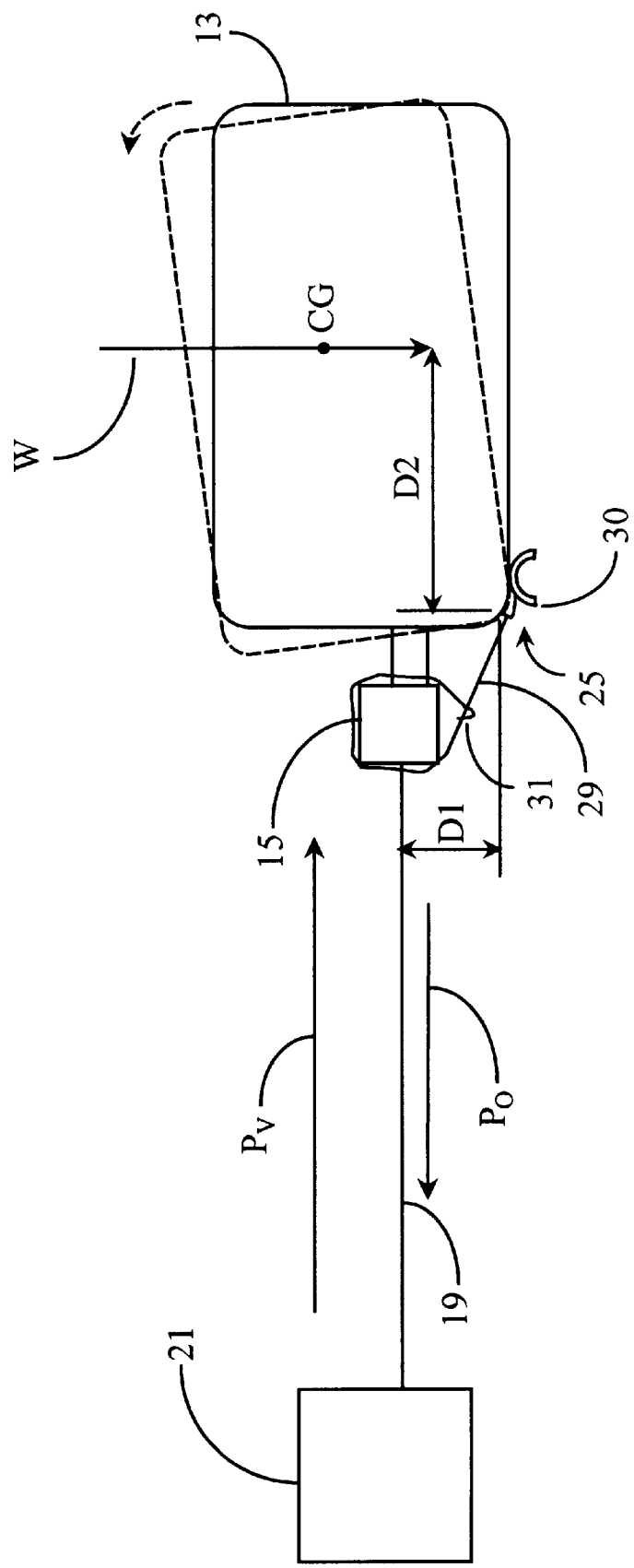
FIG. 3 is a force diagram illustrating the stabilization forces created when using the anchor of FIG. 1 according to an embodiment of the present invention.

FIG. 3 is a block diagram illustrating the stabilization forces created when using anchor 25 of FIG. 1 according to an embodiment of the present invention. All of the element numbers are the elements of FIG. 1. For example, a block 21 represents an object to be winched such as trunk 21 of FIG. 1. Block 13 represents a vehicle such as vehicle 13 of FIG. 1.

A directional-pull force $P_v$ represents actual force pulling on stump 21 from vehicle 13 as affected by winch 15. A directional-pull force $P_O$ represents the reverse effect (equal and opposite reaction) pulling on vehicle 13. As a result of pulling, assuming the cable doesn't break or the winch fail, either stump 21 will become dislodged and move toward vehicle 13, or vehicle 13 will move toward stump 21. Vector W represents the weight of vehicle 13 acting through the center of gravity of the vehicle.

As previously described with reference to FIG. 1, when winch 15 is powered on and begins to pull, force $P_v$ is created. As tension is increased along cable 19, the front wheels of vehicle 13 roll over anchors 25 past center, and are restrained from further motion by the action of tethers 29.

The front edge of the anchors (point 30 in FIG. 3) becomes a fulcrum for forces tending to rotate the vehicle. Force $P_O$ acts about point 30 with a lever arm represented by dimension DI, tending to rotate the vehicle by lifting the back wheels off the ground. The weight W of the vehicle acts through lever arm D2 in the opposite direction to prevent the back wheels from lifting off the ground. D2 is typically considerable greater than D1.

As an example, consider a vehicle of weight 4000 pounds wherein D2 is 6 ft. At the point the back wheels begin to lift, the weight provides a torque about fulcrum point 30 of 24,000 ft-lb. For D1 of 1.5 ft. the vehicle will provide a firm anchor for a force $P_O$ of 16,000 pounds.

In practice the full ability of the anchor system will never be needed, so the back wheels of the pulling vehicle will never be seen to lift appreciably. The length of vehicle 13 is a factor that affects the pulling ability. For example, the longer and heavier the pulling vehicle, the more difficult it is to tilt. The end result is that a winch may be utilized to maximum power without losing vehicle stabilization.

The pull force capable with the stabilization system of the present invention will depend on many factors such as the power of the winch, length of vehicle, weight of the vehicle, center of gravity of the vehicle, and stress durability of the connecting components. Connecting components would include frame, welds, cables, hooks and so on. Assuming that connecting components do not fail, much more pull force may be applied without losing stabilization of the winching vehicle than is possible in the prior art.

In practicing the present invention, a lightweight utility vehicle may be outfitted with a significantly more powerful winch than would normally be used. Such a vehicle, with the aid of the present invention, is capable of performing jobs of a much larger scope than before. For example, a relatively lightweight vehicle could winch a vehicle of substantially more weight up a steep slope.

It will be apparent to one with skill in the art that the method and apparatus of the present invention may be utilized with virtually any type of wheeled vehicle such as a truck or car and so on. Commercial applications are also possible and may include such as perhaps logging vehicles wherein a winch could be used to haul heavy timber up steep slopes. Many such varied uses are possible.

Figure 4:
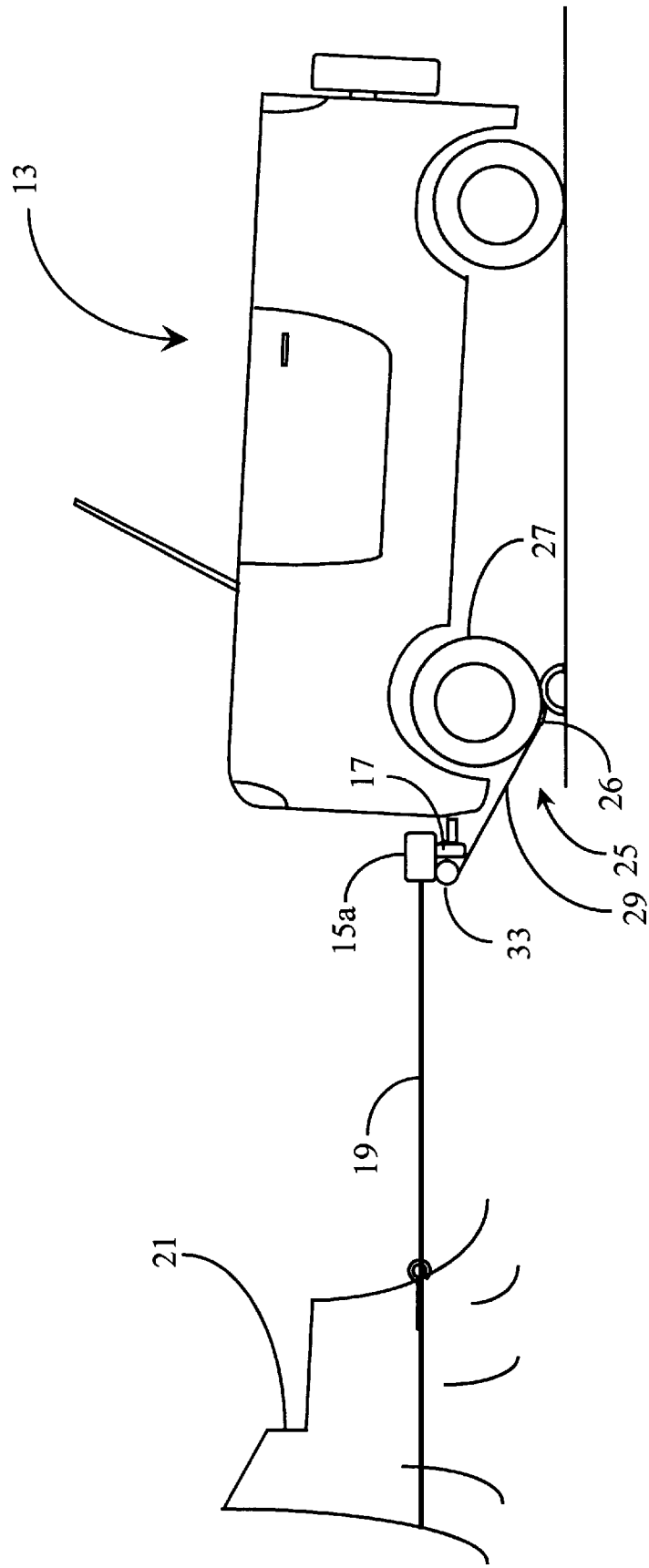
FIG. 4 is an elevation view of a vehicle-stabilizing anchor deployed from storage as part of a winch attached to a vehicle.

It will also be apparent to the skilled artisan that there may be many alterations made in the embodiments described above without departing from the spirit and scope of the invention. For example, there are variety of shapes which an anchor may take, which may each provide a front edge and a structure over which the front wheels may pass center before encountering the restraint of the tethers. Angle iron was disclosed above, along with hex shapes and so on, in addition the hemispherical shape of the split pipe used in the example. There are a variety of materials that may be used for the various elements as well. Lips and shelves of different shapes and sizes may be used, and tethers may be either single pass or dual as disclosed. In addition, the anchor system may be a part of a winch or the structure of the vehicle, rather than loose anchors as shown in the examples. FIG. 4 shows a vehicle-stabilizing anchor 25 deployed from a winch 15a by virtue of a storage and deployment apparatus 33. The spirit and scope of the present invention should be limited only by the claims that follow.

What is claimed is:

1. A vehicle anchor, comprising:

a stop for blocking a track or wheel of a vehicle, the stop being a half-round section of heavy-gauge standard pipe including a protruding lip portion to one side of an elevated center portion, the lip portion for engaging the track or wheel of the vehicle; and a tether having a first end fixedly attached to the stop and a second end with an interface for connecting to a vehicle member.

2. The vehicle anchor of claim 1 wherein the tether comprises a length of chain.

3. The vehicle anchor of claim 1 wherein the tether comprises a length of steel cable.

4. The vehicle of claim 1 wherein the tether is a length of fiber strap.

5. The vehicle anchor of claim 1 wherein the tether attaches to the stop to one side of the elevated center portion.

6. The vehicle anchor of claim 1 wherein the vehicle member to which the tether attaches is a storage and deployment apparatus for storing and deploying the vehicle anchor.

7. The vehicle anchor of claim 6 wherein the storage and deployment apparatus is integrated with a winch attached to the vehicle.

8. A system for anchoring a vehicle during a pulling operation, comprising:

a vehicle anchor having a stop for blocking a track or wheel of a vehicle, the stop being a half-round section of heavy-gauge standard pipe, and a tether having a first end fixedly attached to the stop and a second end; and a storage and deployment apparatus, integrated as part of a winch, connected to the second end of the tether, such that the stop may be stored in a retracted position and deployed by feeding out the tether to place the stop proximate the track or wheel.

9. A method for anchoring a vehicle during a pulling operation, comprising steps of:

(a) placing a stop being a half-round section of heavy-gauge standard pipe in front of a track or wheel of the vehicle; and (b) securing a tether having a first end fixedly attached to the stop by a second end to a vehicle member in a manner that the tether allows the vehicle track or wheel to roll up on the elevated center portion, but not to pass over the stop.

10. The method of claim 9 wherein, in step (b) the vehicle member is a storage and deployment apparatus for storing the stop and deploying the stop for placement in step (a).

* * * * *